Patented Mar. 20, 1934

1,951,785

UNITED STATES PATENT OFFICE 1,951,785

PROCESS OF PREPARING ESTERS

Heinrich Bertsch, Chemnitz, Germany, assignor to H. Th. Böhme Aktiengesellschaft, Chemnitz, Germany No Drawing. Application August 1, 1932, Serial No. 627,218. In Germany August 6, 1931

6 Claims. (Cl. 260—100)

This invention relates to agents for increasing the wetting, penetrating, foam forming, and dispersive properties of liquids and to processes for making the same. The invention is particularly concerned with the production of agents suitable for use in the textile, leather, and allied industries which are economical to produce and which may be effectively used in solutions containing hard water, acid, or metal salts. It is a feature of the invention that the agents in question include or consist primarily of mineral acid esters of glucosides.

It is found that strong mineral acid esters of glucosides are extremely effective in increasing the penetrating and foam forming properties of liquids. For instance, strong mineral acids, their anhydrides or halides, particularly phosphoric acid, phosphoric acid anhydride, phosphoroxychloride, or mixtures of these compounds may be added to various sugars or high polymeric carbohydrates, on the one hand, and to higher alcohols or phenols, on the other, with the result that soluble mineral acid esters of glucosides are formed. These mineral acid esters may be utilized either in their free state or in the form of their salts with alkalies, ammonia, or other organic bases as washing, dispersing, and foam forming agents. One of the important properties of these compounds is the complete electrolytic stability which renders them suitable for use in hard water, sea water, or in dye baths containing metal salts.

The following specific examples are given to illustrate the manner in which the process may be carried out.

Example 1

100 grams of grape sugar in powdered form are introduced at about 40°–45° C. into a mixture of 900 grams of phosphoric acid and 100 grams of phosphorous pentoxide, and 185 grams of lauric alcohol are added slowly, the mixture being simultaneously stirred. The stirring is continued for approximately one hour, the resulting mixture is poured on ice and a sufficient quantity of butyl alcohol is added to effect a smooth separation of the acid water which is then drawn off. The solution is then neutralized with sodium hydroxide of 38° Bé., and a pasty product results which may be obtained in the anhydrous form by drying.

In the foregoing example, other solvents than butyl alcohol may be used, for example pyridine or methylcyclohexanol. Furthermore, the step of separating out the acid water may be eliminated by neutralization of the entire mass, and a dry product may be obtained through evaporation from which the inorganic salt can be separated by treatment with organic solvents.

In the same manner the mineral acid esters of the glucosides can be produced with lower or higher aliphatic alcohols, with cyclo-aliphatic or aromatic alcohols, with phenols, or with the substitution products of these compounds, for example, the amino, chlor, or carboxyl derivatives.

Some further examples follow hereunder:

Example 2

100 grams of mannose in powdered form are introduced at 45° C. into 1000 grams of phosphorous acid and 170 grams of undecenol are added slowly, the mixture being simultaneously stirred. The product is further treated as indicated in Example 1, using methylcyclohexanol instead of butyl alcohol.

Example 3

100 grams of inulin are treated as indicated in Example 2, for mannose.

Example 4

100 grams of milk sugar in powdered form are introduced at 50° C. into 1000 grams of chlorosulphonic acid and 108 grams of benzyl alcohol are added while stirring continuously.

Instead of the phosphoric acid or phosphorous acid and their derivatives other sufficiently strong inorganic oxy acids such as nitric or boric acid may be used. Variations in the properties of the product may also be obtained by the formation of compounds with different alcohol or acid radicals by employing various alcohol or acid mixtures.

All of the aforementioned compounds can be used in the same manner and for the same purposes in the textile and allied industries as the sulphonates and sulphates of the free fatty alcohols. One of the important applications of these compounds is in the process of textile fibre refining, the mineral acid esters having no deleterious effect whatever on the most delicate of fibres.

Having thus described the invention, what is claimed as new and desired to be secured by Letters Patent is:—

1. A process of making mineral acid esters of glucosides which comprises reacting a carbohydrate with a compound selected from the group consisting of alcohols and phenols, and with a mineral acid.

2. A process of making mineral acid esters of glucosides which comprises reacting a carbohydrate with a compound selected from the group consisting of alcohols and phenols, and with a compound selected from the group consisting of phosphoric acid, phosphoric acid anhydride, and phosphoroxychloride.

3. A process of making mineral acid esters of glucosides which comprises reacting a carbohydrate with a compound selected from the group consisting of alcohols and phenols, and with a mineral acid, and neutralizing the reaction product.

4. A process of making mineral acid esters of glucosides which comprises reacting a carbohydrate with a compound selected from the group consisting of alcohols and phenols, and with a mineral acid, adding to the reaction product an organic solvent to separate the acid water, withdrawing the acid water, and thereafter neutralizing the remaining solution.

5. The process of making a phosphoric acid ester of a glucoside which comprises the step of reacting phosphoric acid, sugar, phosphorous pentoxide, and lauric alcohol.

6. Synthetic glucosides of the general formula $R(C_nH_{2n-2}O_{n-1})ac$, wherein "R" designates an alcohol radical, the expression in the brackets designates a carbohydrate radical, and "$ac$" designates a radical of an inorganic oxygen containing strong acid.

HEINRICH BERTSCH.